United States Patent [19]

Gunther

[11] 3,852,034
[45] Dec. 3, 1974

[54] INDICATOR FOR EFFECTIVENESS OF ETHYLENE OXIDE STERILIZATION

[75] Inventor: Donald A. Gunther, Erie, Pa.

[73] Assignee: American Sterilizer Company, Erie, Pa.

[22] Filed: June 21, 1972

[21] Appl. No.: 264,746

[52] U.S. Cl. ..... 23/232 R, 23/253 TP, 195/103.5 R, 252/408
[51] Int. Cl. .......................................... G01n 21/06
[58] Field of Search .................... 23/253 TP, 232 R; 195/103.5; 252/408

[56] References Cited
UNITED STATES PATENTS

| | | | |
|---|---|---|---|
| 2,798,855 | 7/1957 | Hainsworth et al. | 23/253 TP |
| 3,258,312 | 6/1966 | Olson | 23/232 R |
| 3,585,112 | 6/1971 | Ernst | 195/103.5 R |
| 3,627,469 | 12/1971 | Cheng | 23/232 R |
| 3,667,916 | 6/1972 | Silva et al. | 23/253 TP |
| 3,704,096 | 11/1972 | Verses et al. | 23/253 TP |
| 3,732,147 | 5/1973 | Fosker et al. | 23/253 TP |

*Primary Examiner*—R. E. Serwin
*Attorney, Agent, or Firm*—Shanley, O'Neil and Baker

[57] ABSTRACT

An indicator for placement in an ethylene oxide sterilizer changes color if the sterilization has been effective. The indicator includes an amino substituted indicating compound which undergoes color change based on replacement of labile hydrogen in amino groups with hydroxyethyl, and a buffering agent selected to provide an ionic dissociation equilibrium such that color change occurs only when sterilization has been effective.

7 Claims, No Drawings

INDICATOR FOR EFFECTIVENESS OF ETHYLENE OXIDE STERILIZATION

BACKGROUND OF THE INVENTION

This invention relates to ethylene oxide sterilization and in particular to determining whether such sterilization has been effective or not.

Ethylene oxide sterilization is typically utilized in hospitals or laboratories for treating articles, for example of plastic, paper, rubber or the like which cannot withstand heat sterilization. Sterilization is effected when ethylene oxide reacts with contaminating microorganisms to kill or inactivate them. The theory is that such reaction occurs by replacement of labile hydrogen atoms with hydroxyethyl groups with the pH of the microorganism predetermining the ionic dissociation equilibrium whereby labile hydrogen is provided.

The sterilizing is carried out in a chamber as follows. The articles are loaded, and the door to the chamber is closed. A vacuum is drawn to remove air. Then ethylene oxide in admixture with an inert diluent such as dichlorodifluoromethane is introduced until a predetermined pressure is achieved. Temperature and moisture level are adjusted. The articles are left in the chamber for a predetermined time period and then are removed presumably in sterile condition.

A particular sterilization cycle may not be effective for a number of reasons. For example, the sterilizer may have been packed too tightly with articles. There may have been a malfunction. The concentration of ethylene oxide in the sterilizing gas may have been low.

One way of determining whether or not sterilizing has been effective is to include in the sterilizer a biological test strip. Such a strip consists of a selected level of organisms having a resistance greater than is likely to be encountered on the articles being sterilized. After the sterilization cycle is completed, the strip is sent to the laboratory to determine if the organisms on the strip are dead thereby indicating sterilization effectiveness. While this method is reliable, it has the disadvantage of requiring about one week before the results are determined.

Method and apparatus for monitoring ethylene oxide sterilization using indicators which change color based on a change in pH value are disclosed in U.S. Pat. Nos. 2,998,306, 3,000,706 and 3,258,312. These indicators are not specific to the alkylation reaction which is occurring, and this detracts from their reliability.

U.S. Pat. No. 3,627,469 discloses monitoring ethylene oxide sterilization using an indicator which changes color based on an alkylation reaction. Selected substituted pyridines, quinolines, and isoquinolines are used as indicating compounds. The alkylation reaction providing the color change occurs by simple addition to the tertiary nitrogen. Since sterilization is considered to occur by replacement of labile hydrogen, there is no similarity or meaningful relationship between the reaction of this patent and biological sterilization with ethylene oxide. Moreover, according to the disclosure of the patent, for each circumstance, a particular indicating compound is selected that by the nature of its chemical sensitivity has a happenstance reaction rate that is coincidentally suitable. Thus, there is no control of reaction rate with respect to a particular indicating compound and the availability of a particular reaction rate is necessarily limited by the number and availability of such compounds that have the significantly different reaction rates under identical sterilizing conditions.

It is an object of this invention to provide a chemical type of indicator which signals whether or not sterilizing has been effective immediately at the conclusion of the sterilizing cycle, which is one hundred percent reliable and which changes color to indicate sterilizing effectiveness based on a reaction identical in mechanism to the sterilization reaction.

It is a further object of this invention to provide an indicator wherein rate of reaction whereby color change is provided is controlled so that availability of a particular reaction rate is not limited by the number and availability of indicating compounds having significantly different reaction rates under identical conditions.

These objects and others will be evident from the following description of the invention.

DESCRIPTION OF THE INVENTION

The indicators of the present invention comprise a carrier bearing amino-substituted indicating compound which undergoes color change when amino group hydrogen is replaced with hydroxyethyl (the degree of color change depends on the extent of the replacement reaction) and a buffering agent selected to provide amino group dissociation equilibrium such that readily visible color change indicates sterilizing effectiveness.

The reaction involved in providing color change occurs by replacement of labile (reactive) hydrogen on the indicating compound amino group(s) with hydroxyethyl upon reaction of the indicating compounds with ethylene oxide with the pH provided by the buffering agent predetermining the ionic dissociation equilibrium whereby labile hydrogen is provided.

The type of reaction involved is identical to that involved in ethylene oxide sterilization where ethylene oxide is considered to kill microorganisms by replacement of microorganism labile hydrogen atoms and the rate of availability of labile hydrogen is dependent on the pH of the microorganism and its milieu. Thus by selection of a particular buffer, the rate of reaction leading to visible color change can be made to correspond to or be less than the rate of the sterilization reaction so that visible color change indicates effectiveness of sterilization.

The carrier can be, for example, any of the types conventionally employed for chemical indicators. It can be for example of paper, cardboard, plastic film, cloth or the like. Preferably, it is of highly absorbent material such as filter paper with the very preferred material being the filter paper discs known in the biological art as sensitivity discs.

Indicating compounds suitable for use herein include triphenylmethanes, diphenylmethanes, azines including oxazines and thiazines, and xanthenes including rhodamines, containing at least one amino group with the amino nitrogen directly bonded to a ring carbon atom. Such compounds are especially useful in the form of the corresponding acid salt, such as the hydrochloride salt.

Suitable triphenylmethanes and the color change which each undergoes upon replacement of amino hydrogen with hydroxyethyl are the triamino triphenyl carbinols pararosaniline hydrochloride (red changes to violet) and rosaniline hydrochloride (red changes to blue) and the diamino triphenyl carbinols doebners violet (color deepens), and the non-alkylated precursor of malachite green (yellow to blue green). Pararosaniline hydrochloride is the preferred indicating compound.

An example of a suitable diphenylmethane is the non-alkylated precursor to auramine O. This compound deepens in yellow color upon replacement of amino hydrogen with hydroxyethyl.

An example of a suitable azine is safranine T which upon reaction herein changes in color from red to blue. A suitable thiazine is thionine which deepens in purple color upon reaction herein. A suitable oxazine is the non-alkylated precursor of meldola blue which deepens in blue color upon reaction herein.

A suitable rhodamine is the non-alkylated precursor of rhodamine B which deepens in red color upon reaction herein.

The above specifically mentioned indicating compounds are readily commercially available.

Other suitable indicating compounds of the class described are readily evident to those skilled in the dye art.

The inclusion of buffering agent provides a control on the rate of reaction of the indicating compound because by utilizing buffering agents providing different pH's the ionic dissociation equilibrium of the amino group or groups of the indicating compound can be shifted thereby to control rate of availability of labile (reactive) hydrogen atoms on said amino group(s). A comprehensive list of buffering agents is available at page D-102 of the Handbook of Chemistry and Physics (50th edition) published by the Chemical Rubber Company.

A very preferred indicator within the scope of the present invention is one that has been tailored to correspond to a commercially available spore strip; in other words, one that changes color when exposed to the same sterilizing conditions that would kill the microorganisms on the strip. Such tailoring can be carried out by determining the sterilizing time for particular sterilizing conditions to kill the microorganisms on the spore strip and then trying different buffers to alter the pH and dissociation equilibrium until color change occurs at that same time under the same sterilizing conditions. In particular, a cycle can be run for various times to determine the sterilizing time necessary to kill the microorganisms on the spore strip. The cycle is then duplicated utilizing an indicator within the scope of the present invention with the cycle being terminated at the time determined with respect to the spore strip. If the chemical indicator has not undergone an appropriate color change at the termination of the cycle, a buffer of higher pH is substituted; and if color change has occurred, a buffer of lower pH is substituted. In this way a buffer is selected to provide substantially the pH required so that appropriate color change occurs when the microorganisms on the spore strip would be dead.

Preferably the indicators of the present invention are manufactured by preparing an aqueous solution of indicating compound and an aqueous solution of buffer and separately adding the same to a sensitivity disc, then air drying for example for 2 to 12 hours.

The indicators of the present invention have the advantage of indicating directly at the conclusion of the sterilizing cycle whether or not sterilizing has been effective and are one hundred percent reliable inasmuch as the color change is based on a reaction identical in mechanism to the sterilization reaction.

The invention and its advantages is illustrated by the following example.

EXAMPLE

One hundred milligrams of pararosaniline hydrochloride is dissolved in 100 milliliters of distilled water.

Five hundred milligrams of sodium borate and 500 milligrams of boric acid are dissolved in 100 milliliters of distilled water. This buffer supplies a pH of 8.5.

One hundredth of a milliliter of each solution is placed on a ½ inch diameter sensitivity disc (S&S Catalog Number 740-E) utilizing a very accurate pipet.

The indicator is air dried for 4 hours and is then suitable for use.

This particular indicator is formulated according to the above described method to replace the spore strip Spordex (described in the Journal of Hospital Research, Volume 7, No. 1, dated February 1969, at page 57). In other words, it changes color from red to blue under conditions of ethylene oxide sterilization at the time essentially all the microorganisms on the Spordex strip have been killed. It is therefore useful as a replacement for Spordex.

By substituting a buffer consisting of sodium borate only (pH of 9.2) a faster color change is achieved as compared to the above indicator under any set of sterilizing conditions. A slower color change is obtained by substituting a citric acid/phosphate buffer (pH of 7.8) and a still slower change utilizing as a buffer mixed phosphate (pH of 6.9).

Useful indicators are prepared substituting rosaniline hydrochloride, doebners violet, the nonalkylated precursor of malachite green, the non-alkylated precursor of auramine O, safranine T, thionine, the non-alkylated precursor of rhodamine B for the pararosaniline hydrochloride in the above example.

Moreover, other carriers could be substituted for the sensitivity discs above in accordance with methods known to those skilled in the chemical indicator art.

The phrase "non-alkylated precursor" is used herein to mean the compound modified by the phrase with the alkyl groups replaced by hydrogen.

The invention may be embodied in other specific forms without departing from the essential characteristics thereof. The present embodiments are therefore to be considered in all respects as illustrative and not restrictive, the scope of the invention being indicated by the appended claims rather than by the foregoing description, and all which comes within the meaning and range of equivalency of the claims is intended to be embraced therein.

I claim:

1. Chemical indicator for use in an ethylene oxide sterilizer to signal whether or not sterilizing has been effective comprising
   carrier means;
   amino substituted indicating compound which contains hydrogen attached to amino nitrogen and which undergoes color change when hydrogen attached to amino nitrogen is replaced by hydroxyethyl, buffering agent selected to provide amino group dissociation equilibrium such that readily visible color change indicates sterilizing effectiveness.

2. Chemical indicator as recited in claim 1 wherein the indicating compound is selected from the group consisting of acid salts of amino substituted triphenylmethanes, diphenylmethanes, azines and xanthenes.

3. Chemical indicator as recited in claim 2 wherein the acid salt is hydrochloride.

4. Chemical indicator as recited in claim 3 wherein the indicating compound is pararosaniline hydrochloride and the color change is from red to blue.

5. Chemical indicator as recited in claim 4 wherein the buffering agent comprises sodium borate and boric acid in proportions to provide a pH of 8.5.

6. Chemical indicator as recited in claim 5 wherein the carrier means is filter paper.

7. A method of monitoring ethylene oxide sterilization in a chamber by placing in said chamber an indicator which contains an amino-substituted indicating compound which contains hydrogen attached to amino nitrogen and which undergoes color change when hydrogen attached to amino nitrogen is replaced with hydroxyethyl and a buffering agent selected to provide amino group dissociation equilibrium such that readily visible color change indicates sterilizing effectiveness.

* * * * *